Patented Feb. 18, 1941

2,232,053

UNITED STATES PATENT OFFICE 2,232,053

FOAMING COMPOSITION

Karl Daimler, Frankfort-on-the-Main-Höchst, and Max Paquin, Frankfort-on-the-Main, Germany, assignors, by mesne assignments, to General Aniline & Film Corporation, New York, N. Y., a corporation of Delaware No Drawing. Application January 13, 1939, Serial No. 250,712. In Germany February 10, 1938

8 Claims. (Cl. 252—3)

The present invention relates to a liquid, very stable foaming composition in a concentrated form, which when diluted with water in the usual manner to a more or less high degree and then worked up with gases yields a fire-extinguishing foam of an especially good stability and, besides, even at an elevated temperature, of a sufficient resistance to alcohol and, moreover, to acetone, butylacetate, ether and similar solvents, particularly hydrophilic solvents.

By the processes hitherto suggested for the preparation of such foaming compositions the said problem is only insufficiently solved and the compositions thus prepared cannot be used for extinguishing burning alcohol, acetone and the like.

According to this invention protective colloids are mixed in water with watersoluble salts of certain fatty acids and with watersoluble complex compounds of ammonia and a metal. It is also possible to use in the composition, instead of the finished complex compounds of ammonia and a metal, an excess of ammonia and such metal compounds as form watersoluble complex compounds with the ammonia. Such ammonia-metal complex compounds are especially zinc chloride ammonia, zinc sulfate ammonia, copper hydroxide ammonia, copper sulfate ammonia, copper acetate ammonia and other compounds of zinc and copper. Metal salts which do not form complex compounds with ammonia, for instance aluminium salts or aluminium soaps are not adapted for the new composition; and also the salts of copper or zinc can likewise not be used in the absence of ammonia, as in this case the said complex compounds cannot be formed. Suitable fatty acid salts are especially the salts of fatty acids or mixtures thereof having 7 to 11 carbon atoms in a branched or unbranched chain which may also contain unsaturated constituents. The said salts may be used in admixture with the salts of fatty acids having 4 to 6 or 12 carbon atoms. Mixtures of such fatty acids are obtained, for instance, as first runnings in the distillation of fatty acids produced in the synthesis of paraffin or by oxidation as by-products of the synthesis of butanol. They are distinguished from the proper fatty acids of higher molecular weight by their physical properties, particularly by their low melting and boiling points; they are liquid at ordinary temperature.

Suitable protective colloids are, for instance, glue and gelatine and especially the products obtained by an alkaline or acid degradation of albumen substances of any kind which products are still liquid in the cold and contain about 50 per cent of water; furthermore there may be used watersoluble derivatives of cellulose tragacanth, sludge of algae, carrageen moss, pectines and the like, watersoluble salts of lignin and of sulfo-lignin, watersoluble salts of humis acid, furthermore sugars and molasses. There may, of course, likewise be used various mixtures of these protective colloids. Preventatives against freezing, dyestuffs for characterization purposes and the like may be added during the preparation of the extracts.

The concentrated compositions prepared according to the invention yield a foam stable to alcohol and other solvents only if no proper wetting agents such as sulfonic acids of high molecular weight and no saponine are used. Clear, stable, highly concentrated parent solutions containing not more than 75 per cent of water, i. e. extracts of the foaming composition are obtained by mixing the protective colloids with the fatty acids and with an excess of ammonia (in a concentrated form) and then running in, while stirring, the aqueous solution of a metal salt of as high a concentration as possible. The metal salt reacts with the excess of ammonia so as to form a watersoluble complex compound as far as the same is capable of existence.

Another procedure, especially applied in the case of copper salts or copper hydroxide, consists in first dissolving the salts in water and an excess of ammonia, mixing the solution with the protective colloid and then introducing the fatty acid, while stirring. If in the one or other case the extracts obtained are not at once clear, this property may readily be attained by a small increase of the quantity of ammonia, provided that the above named fatty acids and metal compounds capable of forming complex compounds with ammonia have been applied.

The parent solutions obtained are diluted with water of any desired hardness either before or during the preparation of foam which may be carried out in any desired foam-forming apparatus; the solutions ready for use thus obtained have generally a strength of 0.5 to 10 per cent. The compositions are distinguished by a high viscosity even at a low temperature (down to about −20° C.).

The examples in the following tables serve to illustrate the constitution of such parent solutions and the resistance to alcohol of the foam. In comparison with the compositions of the present invention the tables show compositions prepared in another manner which do not yield a useful foam.

stance in contact with glowing metal or wood parts, is prevented even after the direct extin- Table I

|  | 1 | 2 | 3 | 4 | 5 | 6 | 7 | 8 |
|---|---|---|---|---|---|---|---|---|
| Waste liquor of cellulose sulfite 50 percent strength | 50 | 30 | 30 |  | 50 | 50 | 50 | 50 |
| Molasses 50 percent strength |  | 20 |  |  |  |  |  |  |
| Glue degraded by means of NH³ 50 percent strength |  |  | 20 | 50 |  |  |  |  |
| Fatty acid obtained by the oxidation of paraffin (7–9 carbon atoms) | 9 | 9 | 9 | 9 | 9 | 9 | 9 | 9 |
| Ammonia 25 percent strength | 22 | 22 | 22 | 22 | 22 | 22 | 22 | 22 |
| Zinc chloride | 9 | 9 | 9 | 9 |  |  |  |  |
| Copper acetate |  |  |  |  | 9 |  |  |  |
| Calcium chloride |  |  |  |  |  | 9 |  |  |
| Aluminium chloride |  |  |  |  |  |  | 9 |  |
| Ferrous chloride |  |  |  |  |  |  |  | 9 |
| Water (percent) | 10 | 10 | 10 | 10 | 10 | 10 | 10 | 10 |
| Appearance of the concentrated foaming composition | Clear | Clear | Clear | Clear | Clear | Turbid | Turbid | Turbid |
| Resistance to alcohol of the foam | Good | Good | Good | Good | Good | Bad | Bad | Bad |

Table II

|  | 1 | 2 | 3 | 4 | 5 | 6 | 7 |
|---|---|---|---|---|---|---|---|
| Solution of glue degraded by means of KOH 50 percent strength | 40 | 40 | 40 |  |  |  | 35 |
| Waste liquor of cellulose sulfite, delimed 50 percent strength |  |  |  | 60 | 60 | 60 | 20 |
| Ammonia 25 percent strength | 20 | 20 | 20 | 18 | 18 | 18 | 16 |
| Synthetic fatty acid obtained by the oxidation of synthetic paraffin: |  |  |  |  |  |  |  |
| (a) 7–9 carbon atoms | 10 |  |  | 10 |  |  |  |
| (b) 4–11 carbon atoms |  |  |  |  |  |  | 9 |
| Palmnut-kernel oil fatty acid (12–16 carbon atoms) |  | 15 |  |  | 10 |  |  |
| Oleic acid (18 carbon atoms) |  |  | 18 |  |  | 10 |  |
| Zinc chloride | 10 | 10 | 10 |  |  |  |  |
| Copper acetate |  |  |  | 10 | 10 | 10 | 9 |
| Water (percent of the entire composition) | 18 | 15 | 10 | 12 | 12 | 12 | 11 |
| Appearance of the extract of the foaming composition | Clear | Turbid | Turbid | Clear | Turbid | Turbid | Clear |
| Foam-forming power of a solution of 2 percent strength made into foam in the LFG-engine | Good | Bad | Bad | Good | Bad | Bad | Good |
| Resistance to alcohol of the foam | Good | Bad | Bad | Good | Bad | Bad | Good |

Table III

|  | 1 | 2 | 3 | 4 | 5 | 6 | 7 |
|---|---|---|---|---|---|---|---|
| Waste liquor of cellulose sulfite 50 percent strength | 60 | 60 | 60 | 60 | 60 | 60 |  |
| Solution of saponine 50 percent strength |  |  |  |  |  |  | 60 |
| Ammonia 25 percent strength | 20 | 20 | 20 | 20 | 20 | 20 | 20 |
| Synthetic fatty acid obtained by the oxidation of synthetic paraffin 7 to 9 carbon atoms | 9 |  |  |  |  | 9 | 9 |
| Synthetic fatty acid obtained in the synthesis of butanol: |  |  |  |  |  |  |  |
| (a) 7–9 carbon atoms |  | 9 |  |  |  |  |  |
| (b) 9–11 carbon atoms |  |  | 9 |  |  |  |  |
| Palmnut-kernel oil fatty acid 12–16 carbon atoms |  |  |  | 9 |  |  |  |
| Oleic acid 18 carbon atoms |  |  |  |  | 9 |  |  |
| Zinc chloride | 6 | 6 | 6 | 6 | 6 |  | 6 |
| Water (percent) | 5 | 5 | 5 | 5 | 5 | 11 | 5 |
| Appearance of the concentrated foaming composition | Clear | Clear | Clear | Lumpy | Lumpy | Clear | Clear |
| Foam-forming power of a solution of 2 percent strength in water of 20° German hardness made into foam in the LFG-engine | Good | Good | Good | No foam | No foam | Moderate | Good |
| Resistance to alcohol of the foam | Good | Good | Good |  |  | Bad | Bad |

Examples Nos. 6, 7 and 8 of Table I show that compositions containing such metal salts as do not form complex compounds with ammonia are not suitable; Examples Nos. 2, 3, 5 and 6 of Table II and Nos. 4 and 5 of Table III are compositions containing salts of fatty acids with more than 12 carbon atoms which, therefore, are unsuitable. Examples 6 and 7 of Table III show that the foam obtained from compositions lacking complex compounds of metal salts and ammonia or protective colloids are not resistant to alcohol. The feature of a good resistance to alcohol of the foam produced together with a good yield and stability of the foam is characteristic for the new compositions.

The resistance to alcohol and acetone of the foam is proved by the fact that the foam produced floating on the alcohol or any other hydrophilic liquid remains stable for a very long time and is not "eaten up" by the alcohol. Owing to this stability a re-inflaming of the alcohol, for in-guishing of the flames. The special resistance of the foam obtained from the extracts according to this invention, however, cannot always be perceived in the very moment of the formation of foam, but at least after a period of some seconds to half a minute. According to the duration of this period the composition may be made into foam in devices which throw the foam directly after its formation onto the place of burning or there are to be used devices in which the finished foam flows through a long hose pipe which allow the resistance to alcohol of the foam to ripen. In general the composition is used in a dilute solution of 2 to 4 per cent strength. When applied in a solution of 4 per cent strength, the foam forming power is in the usual devices about 8 to 10 times as great as the volume of the starting material and the stability of the foam, even on solid articles, is extraordinarily great.

The LFG-engine used in the examples of Tables II and III is a pump wherein the liquid is mixed with air in a finisher. Finishers are tubes wherein the jets are strongly broken by solid bodies arranged therein (filling bodies, brushes, fibers, nets or the like) and a strong mixture with the air added is obtained thereby, so that a foam finally results. The foaming action of the LFG-engine is in general stronger than that of foam tubes having an injector action.

We claim:

1. A new composition of matter, liquid at ordinary temperature and miscible with water even at a temperature of about —20° C., yielding with water and gases a stable foam for extinguishing burning hydrophilic liquids, the said composition comprising water-soluble salts of at least one fatty acid with 7 to 11 carbon atoms, protective colloids, complex compounds of ammonia and a metal which is capable of forming water-soluble complex compounds with ammonia and not more than 75 per cent of water.

2. A new composition of matter, liquid at ordinary temperature and miscible with water even at a temperature of about —20° C., yielding with water and gases a stable foam for extinguishing burning hydrophilic liquids, the said composition comprising water-soluble salts of at least one fatty acid with 7 to 11 carbon atoms and of at least one fatty acid selected from the group containing 4, 5, 6 and 12 carbon atoms, protective colloids, complex compounds of ammonia and a metal which is capable of forming water-soluble complex compounds with ammonia and not more than 75 per cent of water.

3. A new composition of matter, liquid at ordinary temperature and miscible with water even at a temperature of about —20° C., yielding with water and gases a stable foam for extinguishing burning hydrophilic liquids, the said composition comprising water-soluble salts of at least one fatty acid with 7 to 11 carbon atoms, at least one protective colloid selected from the group consisting of albumen, products obtained by an alkaline or acid degradation of albumen, watersoluble derivatives of cellulose, tragacanth, sludge of algae, carrageen moss, pectines, watersoluble salts of lignin and of sulfolignin, watersoluble salts of humic acid, sugars and molasses, complex compounds of ammonia and a metal which is capable of forming water-soluble complex compounds with ammonia and not more than 75 per cent of water.

4. A new composition of matter, liquid at ordinary temperature and miscible with water even at a temperature of about —20° C., yielding with water and gases a stable foam for extinguishing burning hydrophilic liquids, the said composition comprising watersoluble salts of at least one fatty acid with 7 to 11 carbon atoms, protective colloids, complex compounds of ammonia and at least one metal selected from the group consisting of zinc and copper and not more than 75 per cent of water.

5. A new composition of matter, liquid at ordinary temperature and miscible with water even at a temperature of about —20° C., yielding with water and gases a stable foam for extinguishing burning hydrophilic liquids, the said compositions comprising watersoluble salts of at least one fatty acid with 7 to 11 carbon atoms and of at least one fatty acid selected from the group containing 4, 5, 6 and 12 carbon atoms, protective colloids, complex compounds of ammonia and at least one metal selected from the group consisting of zinc and copper and not more than 75 per cent of water.

6. A new composition of matter, liquid at ordinary temperature and miscible with water even at a temperature of about —20° C., yielding with water and gases a stable foam for extinguishing burning hydrophilic liquids, the said composition comprising watersoluble salts of at least one fatty acid with 7 to 11 carbon atoms and of at least one fatty acid selected from the group containing 4, 5, 6 and 12 carbon atoms, at least one protective colloid selected from the group consisting of albumen, watersoluble derivatives of cellulose, products obtained by an alkaline or acid degradation of albumen, tragacanth, sludge of algae, carrageen moss, pectines, watersoluble salts of lignin and of sulfolignin, watersoluble salts of humic acid, sugars and molasses, complex compounds of ammonia and a metal which is capable of forming water-soluble complex compounds with ammonia and not more than 75 per cent of water.

7. A new composition of matter, liquid at ordinary temperature and miscible with water even at a temperature of about —20° C., yielding with water and gases a stable foam for extinguishing burning hydrophilic liquids, the said composition comprising watersoluble salts of at least one fatty acid with 7 to 11 carbon atoms, at least one protective colloid selected from the group consisting of albumen, products obtained by an alkaline or acid degradation of albumen, watersoluble derivatives of cellulose, tragacanth, sludge of algae, carrageen moss, pectines, watersoluble salts of lignin and of sulfolignin, watersoluble salts of humic acid, sugars and molasses, complex compounds of ammonia and at least one metal selected from the group consisting of zinc and copper and not more than 75 per cent of water.

8. A new composition of matter, liquid at ordinary temperature and miscible with water even at a temperature of about —20° C., yielding with water and gases a stable foam for extinguishing burning hydrophilic liquids, the said composition comprising watersoluble salts of at least one fatty acid with 7 to 11 carbon atoms and of at least one fatty acid selected from the group containing 4, 5, 6 and 12 carbon atoms, at least one protective colloid selected from the group consisting of albumen, products obtained by an alkaline or acid degradation of albumen, watersoluble derivatives of cellulose, tragacanth, sludge of algae, carrageen moss, pectines, watersoluble salts of lignin and of sulfolignin, watersoluble salts of humic acid, sugars and molasses, complex compounds of ammonia and at least one metal selected from the group consisting of zinc and copper and not more than 75 per cent of water.

KARL DAIMLER.
MAX PAQUIN.